United States Patent [19]

Macchiarulo et al.

[11] Patent Number: 4,696,665
[45] Date of Patent: Sep. 29, 1987

[54] PULLEY FOR A SYNCHRONOUS DRIVE SYSTEM COMPRISING A POLYMERIC MATERIAL TOOTHED-BELT AND RELATED TRANSMISSION

[75] Inventors: Vincenzo Macchiarulo, Chieti; Ezio Marcelli, Pescara, both of Italy

[73] Assignee: Pirelli Trasmissioni Industriali S.p.A., Milan, Italy

[21] Appl. No.: 742,237

[22] Filed: Jun. 7, 1985

[30] Foreign Application Priority Data

Jun. 11, 1984 [IT]  Italy ............................... 21346 A/84

[51] Int. Cl.$^4$ ............................................. F16H 7/02
[52] U.S. Cl. ..................................... 474/153; 474/205
[58] Field of Search ...................... 474/152, 153, 205

[56] References Cited

U.S. PATENT DOCUMENTS 4,371,363  2/1983  Cicognani et al. ................... 474/205
4,403,979  9/1983  Wujick ................................. 474/153

FOREIGN PATENT DOCUMENTS

0049962  4/1982  European Pat. Off. .
0106694  4/1984  European Pat. Off. .
0017663  4/1977  Japan .
 842428  7/1960  United Kingdom .
1558766  1/1980  United Kingdom .

Primary Examiner—James A. Leppink
Assistant Examiner—Thuy M. Bui
Attorney, Agent, or Firm—Stevens, Davis, Miller & Mosher

[57] ABSTRACT

A pulley for a synchronous drive system comprising a toothed-belt of polymeric material, the pulley comprising grooves provided with flanks having a parabolic arc-shaped profile and a bottom whose ends coincide with the vertices of said parabolic arc-shaped profile. The length of the bottom is comparable with that of the parabolic arc-shaped profiles. Preferably, the grooves have a shape determined by a hob whose rolling pitch line is tangent to the outer circumference of the pulley.

12 Claims, 11 Drawing Figures

PULLEY FOR A SYNCHRONOUS DRIVE SYSTEM COMPRISING A POLYMERIC MATERIAL TOOTHED-BELT AND RELATED TRANSMISSION

DESCRIPTION

The present invention relates to a pulley for a synchronous drive system comprising a toothed belt of polymeric material and to the related transmission including said pulley.

As is well known, the main problems to be solved in the transmission of motion between toothed-belts and pulleys are two: The first problem is that of guaranteeing a correct engagement of the belt tooth both in the step of going into the corresponding groove pulley and in the step of coming out of the corresponding pulley groove, respectively, in and from the corresponding groove of the pulley. The second problem is that of avoiding the so-called belt tooth skipping phenomenon from the groove of the pulley where the belt tooth is completely engaged for the synchronous transmission of motion.

The first problem relates to the steps carried out before and after the complete engagement between the teeth of the belt and of the pulley; the solution to be sought is therefore limited to a time that can be defined as temporary with respect to the real engagement time. In these transient steps, the forces exchanged between the belt and the pulley are practically sliding forces not useful to the transmission of motion and, in fact, negative in nature in connection with both the life of the belt and a correct transmission.

In fact, the sliding forces determine in time the wearing of the belt formed by an elastomeric material, with the consequence of subjecting the outermost surface of the belt to the action of aggressive substances, such as dust, polluting substances mixed with traces of oil, and various other unwanted impurities that give rise to and increase not only the deterioration of the belt body, but they can also modify the profile chosen for the engagement step, and thus result in slack and noise between the modified profile of the belt tooth and the unchanged profile of the pulley groove.

The second problem to be solved refers to the transmission of motion and takes a considerably longer time than that relating to the engagement and disengagement of the belt tooth with the pulley slot; in fact, the belt tooth is and remains completely engaged in the pulley groove for the entire period that the belt winds around the pulley. During the entire engagement step, the tooth-skipping phenomenon could occur for two reasons:

The first reason is connected with the curvature of the pulleys around which the belt winds, in particular, when rather greater transmission ratios are used; in this case, since the belt during its winding around the pulley comprises on its inside a rigid insert that can not follow the curvature imposed by the pulley with smaller diameter.

The second reason is connected with the number of teeth which is less in one pulley with respect to the other in order to realize a predetermined transmission ratio.

As is quite understandable, the smaller the number of the teeth in the pulley bearing the entire force to be transmitted and to receive it, the greater will be the risk of a possible tooth-skipping phenomenon.

The problem of the tooth-skipping phenomenon is more marked in the present state of the art, where there is a tendency more and more to use a very small number of teeth in one of the two pulleys of the driving system, and at the same time tending toward higher and higher forces to be transmitted. Therefore, it is clear that the present state of the art requires solutions in which the tooth-skipping phenomenon is a drawback which must be avoided in the practical use of synchronous driving systems.

In fact, it is apparent that the drawbacks due to the transient steps, i.e., those relating to the engagement and disengagement between the teeth of the belts and the grooves of the pulleys, could also be tolerated since the wearing of a belt tooth is slow and can be eliminated by replacing the worn belt during one of the maintenance periods.

On the contrary, however, the tooth-skipping phenomenon is a sudden and an unexpected drawback and can have negative and irreparable consequences in a synchronous drive system.

Therefore, the present invention aims at improving the present pulleys and the relative transmissions between the toothed belts and the pulleys so as to overcome at the same time both the problems connected with the engagement and disengagement steps of the belt tooth from the relative grooves of the pulleys and, in particular, the problem connected with the phenomenon of the belt tooth skipping from the groove of the pulley, with the net result of improving as much as possible the noiselessness of the drive system in which the pulley according to the invention is employed.

Therefore, the object of the present invention is a pulley suitable for the transmission of motion with a flexible toothed belt of polymeric material comprising a plurality of groove alternating with teeth, characterized in that each groove comprises two flanks having a parabolic arc-shaped profile and a bottom whose ends coincide with the vertices of the parabolic arc-shaped profiles, the length of said bottom being substantially comparable with the length of each parabolic arc-shaped profile of the flanks of said groove.

Preferably, each parabolic arc-shaped profile is defined by the curve:

$$Y = KX^2$$

where K is between 0.09 and 25.83 on varying of the dimensions of the profile.

The present invention will be still better understood by the following detailed description, made by way of non-limiting example with reference to the attached sheets of drawings, in which.

Figure 1:
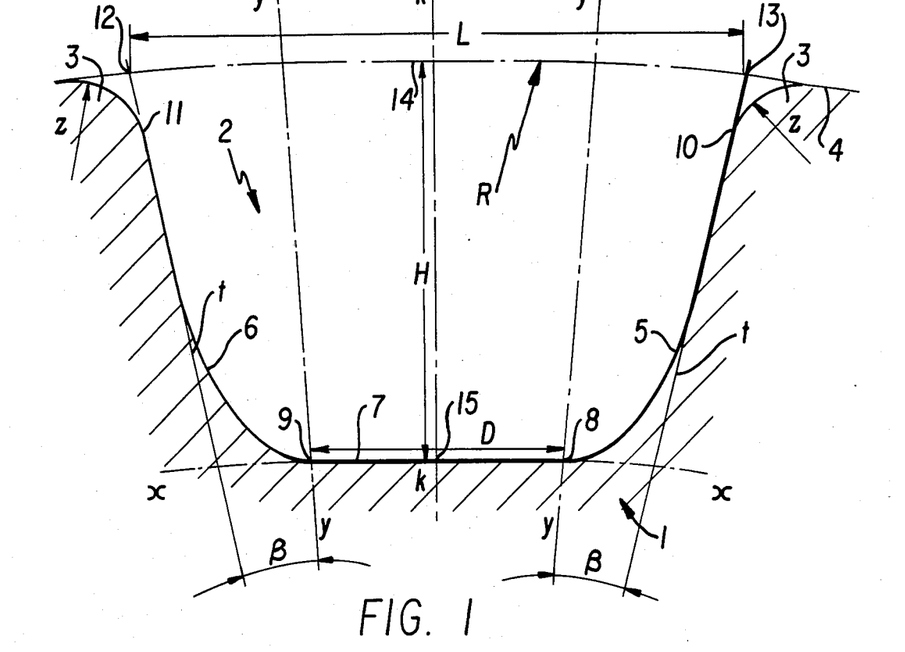
FIG. 1 is a transverse section of a groove of the pulley according to this invention.

With reference numeral 1, FIG. 1 shows a portion of a pulley of metallic material or of a rigid plastic material equivalent to metal (e.g., a polyamid such as nylon), of the type adapted for use in a synchronous transmission of motion with a toothed belt of polymeric material, in particular of elastomeric material with longitudinal reinforcing inserts (not shown) of a per se conventional arrangement.

The pulley comprises a plurality of grooves 2, each groove being as shown in FIG. 1, alternating with teeth delimited in the upper part by the outermost circumference. The groove 2 comprises two flanks 5, 6 and a bottom 7. More particularly, the groove 2 comprises two flanks each having a parabolic arc-shaped profile and a bottom whose ends 8, 9 coincide with the vertices of the parabolic arcs traced with reference to a system of cartesian axes x and y.

In the embodiment of FIG. 1, the bottom 7 is defined by a curvilinear portion with curvature substantially near a rectilinear portion of a length D. Alternatively, the bottom 7 may have a path which differs from that of FIG. 1 in comprising a convexity toward the outside or also an opposite curvature or also, according to another embodiment, a rectilinear path alternating with curvilinear portions to originate projections, protuberances and the like as, for instance, elements able to cause a contact, if desired, with the crest of a belt tooth.

In all the cited embodiments mentioned above, the bottom 7 comprises the essential characteristic of having a path defined by a length comparable with the length of each parabolic arc-shaped profile 5 or 6. The meaning of the word "comparable" in this context is that the distance D between the ends 8, 9, i.e., between the vertices of the two parabolic arcs, is equal to or at least greater than 65% of the length of each parabolic arc measured between the vertices 8, 9 and the radially outermost points 10, 11 of each parabolic arc. The radially outermost points 10, 11 are those determined by the tangent to the circle of radius r defining the teeth 3 of the pulley.

Figure 1A:
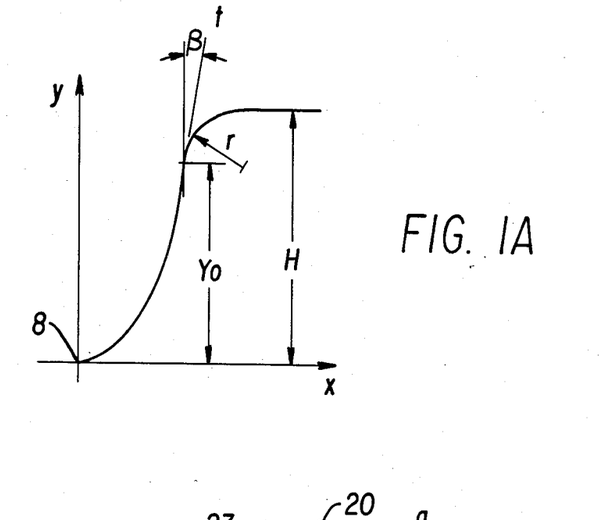
FIG. 1a shows one of the flanks of the groove of FIG. 1.

Preferably, in all the solutions to which the present invention is directed, the parabolic arc-shaped profile of the flanks 5 or 6 is determined by the formula:

$$Y = KX^2$$

where, referring to FIG. 1a, Y is the axis passing through the center of the pulley and through the point 8 of FIG. 1; X is the axis orthogonal to Y passing through the same point 8.

The coefficient K is given by the formulae:

$$K = \frac{tg^2(90 - \beta)}{4 Y_o}$$

and $$Y_o = H - r(1 - \sin \beta)$$

where, with reference to FIG. 1a:
H = total height (mm)
β = angle formed by the tangent t, common to the parabola and to the contact circle, with the axis Y;
r = radius of the contact circle (mm)
Yo = ordinate relative to the tangent point between the parabola and the contact circle.

The values of the above-mentioned geometrical parameters assume a considerable importance in the present invention, since the shape of the groove profile and the results achieved with said profile depend on said values.

Particular embodiments of the present invention are obtained by imposing the following limits on the above-mentioned parameters:
H = 0.7 and 15 (mm)
β = 8° and 25°
r/H = 2.87 and 5
Yo ≧ 0.7H K varies from 0.09 to 25.83 for grooves having a height from 0.7 to 15 mm.

The geometrical characteristics of the lateral profiles 5, 6 and of the bottom 7 are particularly suitable to define grooves belonging to pulleys having a very low number of teeth, up to values of 10 teeth.

Also, preferably, the ratio between the width L and the depth H of the groove is between 1.3 and 3, where:

the width L is measured between the points 12 and 13 parallel to the bottom of the pulley; the points 12 and 13 are determined by the intersection of the two tangents t with the circumferential line 4.

the depth H is measured in a radial direction between the points 14, 15 at the center of the bottom 7 and on the outermost circumferential line 4 of the pulley, respectively.

The embodiment of FIG. 1 may correspond to a pulley having a number of teeth Z = 38 and a ray R that consequently results, determined by:

$$R = Pi \times 38 \div 2\pi$$

where Pi represents the pitch between two contiguous grooves of the pulley.

The pulley 1 is part of a transmission of motion comprising in its entirety at least two pulleys, a driving pulley and a driven pulley, respectively, and a toothed belt formed by a body of polymeric material, more particularly of elastomeric material, reinforced with longitudinal reinforcements, in particular of glass fibers, and by projecting teeth covered or not with a fabric. In this drive system, one of the two pulley may be according to that shown in FIG. 1. The second pulley of the drive system may have characteristics different from those of the first pulley; for instance, the lateral profiles of one of the two pulleys may have rectilinear portions with grooves substantially shaped according to the configuration of a trapezium.

In other words, the characteristics of the pulley of FIG. 1 are such as to permit its use in a drive system already provided for working with a belt of predetermined configuration and having a corresponding pulley profile different from that of the present invention. In other words, in most cases of known transmissions, the groove profiles of the pulleys are in connection with a determined profile of the belt tooth. In the cited known transmissions, whatever the profile of the belt tooth is, it is possible to use the pulley of the present invention in place of those already shown—and all this without changing the type of the tooth belt profile.

The pulley according to the present invention comprises, in particular, the characteristics of the profiles formed by the step of rolling the cutting pitch line of the hob on the outer circumference of the pulley, as explained in detail hereinafter.

The belt associated with the pulley according to the present invention may be covered with a self-lubricating fabric disposed on the teeth and on the grooves, as described in German Patent Publication No. PS 20 16 830.3. Alternatively, the belt may be covered with a double fabric, as described in the German Patent Publication No. PS 23 63 685.3.

The profile of the belt teeth which are part of the drive system may be, for instance, such as that described in U.S. Pat. No. 4,371,363, or also the belt may have teeth with a trapezium-shaped profile or, according to further modifications, the belt may have the tooth provided with a central slot, as described in Italian Patent Application No. 19 872 A/82.

Moreover, the profile of the belt tooth may be conjugated or not conjugated with respect to that of the corresponding pulley groove.

It has been found that the drive system for the transmission of motion comprising toothed belts with pitch 9.525 mm, width 15 mm, and development (total length) of from 800 to 1900 mm, are particularly suitable for the purposes of the present invention.

These belts are associated with pulleys (having the grooves as shown in FIG. 1) having a transmission ratio of 1:2. In particular, the belts and the pulleys are adapted to be used for the controls of the distribution of internal combustion engines, such as automobiles, comprising pulleys having a transmission ratio 1:2 and, more specifically, a first pulley with 21 teeth and a second pulley with 42 teeth.

According to another embodiment, the drive system according to the present invention comprises a toothed belt having a tooth profile according to U.S. Pat. No. 4,371,363, and two pulleys comprising 16 teeth for the driving pulley and 32 teeth for the driven pulley, respectively.

The present invention attains all the desired objectives. The absence or at least the appreciable reduction of the risk connected with the tooth-skipping phenomenon in a drive system comprising a pulley, according to the present invention, appears to be due to the contemporaneous presence of a groove bottom having a length comparable to those of the flanks of the same groove and a parabolic arc configuration of the flanks with the vertices of the parabola at the extremities of the groove bottom.

In particular, flanks curved according to the following formula assume importance in the reduction of the risk connected with the tooth-skipping phenomenon:

$$Y = KX^2$$

where K is between 0.09 and 25.83.

Figure 2:
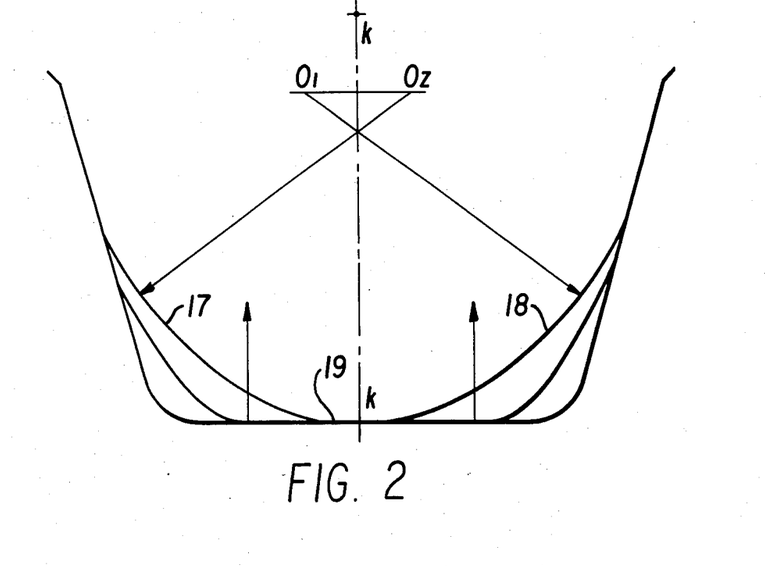
FIG. 2 is a section of the groove of a pulley according to the invention with respect to the pulleys according to the state of the art.

The characteristics of the pulley according to the present invention are better stressed in FIG. 2 with regard to the pulleys of the known technique, with equal geometrical dimensions of the groove, i.e., depth H and width L, trapezium-shaped groove, or grooves provided with two arc-of-a-circle-shaped flanks 17, 18, with centers $O_1$ and $O_2$ equally spaced with respect to the axis of symmetry KK and the groove bottom 19 with a short rectilinear portion.

Figure 3:
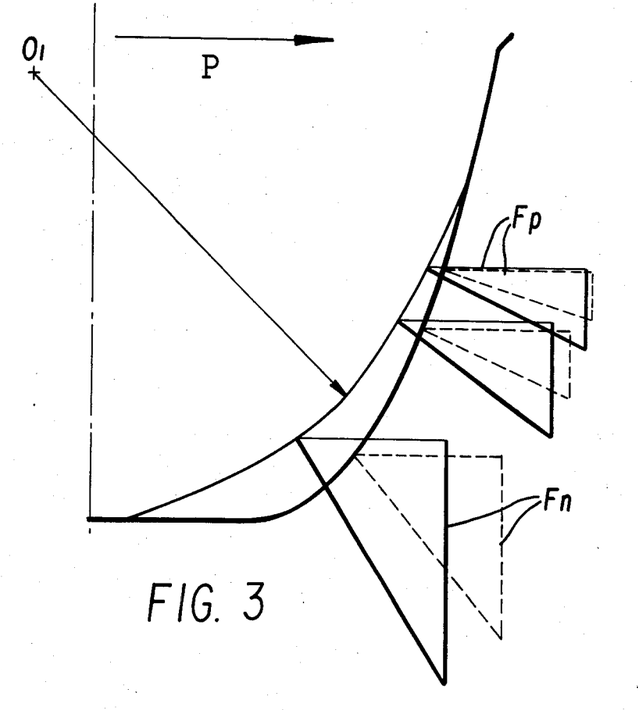
FIG. 3 shows the distribution of the stresses between the belt tooth and the corresponding pulley, referred both to the pulley of the invention and to the pulley of the state of the art.

The optimal results attained by the present invention will be still better understood from FIG. 3, where there are shown the stresses originated between a belt tooth and the relative pulley groove when the belt tooth is completely inside the groove, and remains so during the arc of contact between the belt and the pulley.

In FIG. 3, the stresses are represented both in connection with the drive system comprising a pulley according to the present invention, and in connection with a drive system comprising the known pulley represented in FIG. 2.

The part relating to the stresses according to the present invention is drawn with a broken line in FIG. 3.

In respect of the transmission of motion between the belt tooth and the pulley groove, the particular profile of the belt tooth is not shown; in fact, the reasoning explained herein is independent of the fact that the profiles are conjugated or not since, in respect of the transmission of motion in the step under consideration, i.e., during the complete penetration of the belt tooth into the groove, owing to the particular formation of the belt tooth of elastomeric material, one of the tooth flanks presses practically on the entire profile of the corresponding groove flank.

In the embodiment shown in FIG. 3, it is assumed that the thrust P, useful for the transmission of motion between the belt and the pulley, can be divided for the tooth and the groove of the figure into numerous small thrusts $F_p$ of equal value, to which, according to the composition of forces shown in the figure, vertical thrusts $F_n$ correspond.

The vertical thrusts $F_n$ tend to turn into a sliding tooth-profile and groove-profile; however, as clearly indicated in the figure, the vertical components $F_n$ relative to the pulley having the groove delimited by parabolic arc-shaped flanks are substantially less than the vertical thrusts $F_n$ relative to the pulley having the flanks shaped according to an arc of a circle.

According to the embodiments shown by way of example in FIG. 3, in the pulley according to the present invention the vertical thrusts $F_n$ can reach values of about 60% of the vertical thrusts relating to pulleys according to the state of the art; this produces both a slower wearing of the toothed belt material and, in particular, a marked improvement as regards the elimination of the skipping phenomenon between belt tooth and pulley groove.

The elimination of the skipping phenomenon is a favorable characteristic for all the pulleys of various maximum pitch diameter according to the present invention, but it is much more substantial when there are used for pulleys with great curvature the same dimensions as the parabolic arc and the distance between the vertices of the parabolic arcs when only a few teeth are acting, and therefore when the risk of the skipping phenomenon is greater.

Then the use of one and the same groove, i.e., a groove with dimensions of equal maximum width and maximum depth independently of the pitch diameter of the pulley in one and the same drive system, turns also into a still further advantage since it does not change the contact between the pulley tooth and the belt tooth in the pulleys with a smaller number of teeth, a wider bearing surface, in particular, with low specific pressures being attained. This latter characteristic is useful for the duration and the lifetime of the belts, since the small diameter pulleys in one and the same drive system, having a low specific pressure, produce a slower wearing of the materials forming the toothed belt.

The fact of having moved the vertices of the two parabolic arcs at a considerable distance with respect to the central axis of symmetry KK (FIG. 1) assumes also importance in respect of the skipping phenomenon.

In fact, the present invention with the pulley permits the engagement with a belt tooth of a greater thickness in the outermost part with regard to the pulley of the state of the art represented in FIG. 2 by arcs 17, 18.

Figure 4:
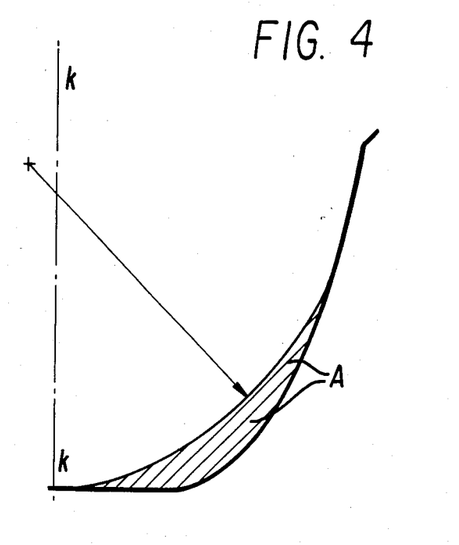
FIG. 4 shows in cross-section the lightening of the pulley according to the invention with respect to the pulleys of the state of the art with equal geometrical dimensions.

This consideration is much more apparent in FIG. 4, in which the region A, with oblique lines, indicates the reduction of the metallic area of a pulley with a parabolic arc-shaped profile, in comparison to a pulley with an arc-of-a-circle-shaped profile, with equal depth and maximum width of the groove in the upper inlet part.

This fact permits, when the belt tooth is completely inside the groove, a deformation of a greater quantity of elastomeric material in the most flexible part of the belt tooth, generating a greater opposition to the thrust, which would tend to slide it and therefore to make it skip out with respect to the pulley tooth.

All this, although an approximation, is analogous to what could happen for instance in a more deflated tire with respect to a more inflated tire, i.e., a tire that being more deflated and having a wider area of contact with respect to the other one would tend on braking to skid less, since in the deformation there is involved a greater quantity of elastomeric material.

In practice with the present invention, owing to very intense thrusts, the belt tooth tends progressively to press and to involve more layers of elastomeric material of the tooth of the belt before coming out of the pulley groove, such as would bring about the so-called skipping phenomenon.

The results obtained are very surprising. In fact, U.S. Pat. No. 3,756,091 teaches reducing the quantity of elastomeric material present in a belt tooth with respect to a trapezium tooth. At this stage, the present inventors moved toward an opposite teaching, and instead of reducing and removing the material from the elastomeric part of the conventional belt, they have reduced the thickness of the pulley tooth, as schematically indicated in FIG. 4 with oblique lines, i.e., some material has been removed from the pulley of the state of the art. Having removed some material from the pulley, the further result of reducing the involved heavy masses is achieved, with the consequent highly advantageous reduction in vibration and noise.

The achieved advantage becomes evident upon looking at FIG. 4. In fact, from that figure it is apparent that the mass reduction at least for one of the two pulleys is substantial, being represented by the following formula:

$$2 \times A \times l \times n$$

where:

$l$ = the dimension perpendicular to the plane of the drawing corresponding to the width of the pulley;

$n$ = number of the grooves; and $A$ = the area of the hatched portion, as shown in FIG. 4.

The result achieved from that which is shown in the formula just cited may then be extended to the two pulleys (a driving pulley and a driven one) drive system, with a corresponding reduction in the total of the involved heavy masses constituted generally by metallic pulleys.

Moreover, the essential characteristics of the pulley of the present invention contribute greatly to improving the transient steps of separation of the belt teeth from the pulley grooves. This result is obtained by having recourse to drive systems comprising at least one pulley according to the present invention and belts having the tooth profile of different shapes, for instance of trapezium shape, or arc-of-a-circle shape, or with teeth characterized by parabolic arc-shaped flanks provided or not with a groove at the crest of the tooth. In fact, in the cited drive systems, the characteristic configuration of the parabolic arc-shaped flanks of the pulley of the present invention and the distance between the vertices of the two parabolas permit favorable progression and gradual engagement between the tooth and the belt and corresponding pulley groove.

The situation of favorable engagement is determined by the particular configuration of the pulley flank, a configuration characterized by first infinitesimal, nearly rectilinear, portions, i.e., portions having less curvature, and by subsequent portions having a curvature which increases more and more up to the extreme point of the groove bottom, according to a specific curve determined by the value of the parameter K.

Consequently, owing to the gradual nature of the curvature of the groove flank, the belt tooth is guided and during the engagement step is forced to make a contact which is gradual, with a desired and predetermined deformation of the elastomeric part of the tooth.

In other words, by means of the characteristics according to the present invention, the engaging step is guided whatever the specific profile of the belt tooth may be, with deformations of the belt tooth imposed by the shape of the flank of the pulley groove, the whole so as to obtain a continuous control of the engagement step, and always maintaining the deformations and the consequent unavoidable slidings and the relative wearing to very reduced values owing to the cited gradual curvature of the groove flank.

A further advantageous aspect of the present invention is a groove having parabolic shaped flanks, as previously described, formed by a hob 20 (FIG. 5) whose cutting pitch 21 is tangent to the outer circumference 22 of the pulley.

In order to explain further this particular aspect of the present invention, reference will now be made to the diagrammatic view of FIG. 5, where the hob 20, according to the state of the art, originates the profile of the pulley groove in a way completely different from that previously said, i.e., its pitch line 23 is tangent to the pitch line of the pulley with a circumference of diameter $\Phi_1$ and rolls on this latter pitch line.

As will be observed in this view, the pitch line of the hob has a distance "a" on the line which delimits the root of the hob teeth, and also a distance "a" from the outer circumference of the pulley of a diameter $\Phi_1$ of which it generates the grooves.

Calling the hob pitch P and the number of the grooves and teeth to be generated on the pulley z, the situation is defined by the formula:

$$P = \frac{(\phi_1 + 2a)}{z} \pi$$

Following the known technique, it will be noted that the profiles of the grooves of the pulley differ according to the rolling diameter.

This circumstance shows negative aspects when profiles of the grooves are to be created on smaller and smaller diameter pulleys, for instance, pulleys provided with 10 teeth, pitch of 3 mm or 20 mm, and therefore with diameters of 9.55 mm and 64 mm.

Figures 5, 6, 7:
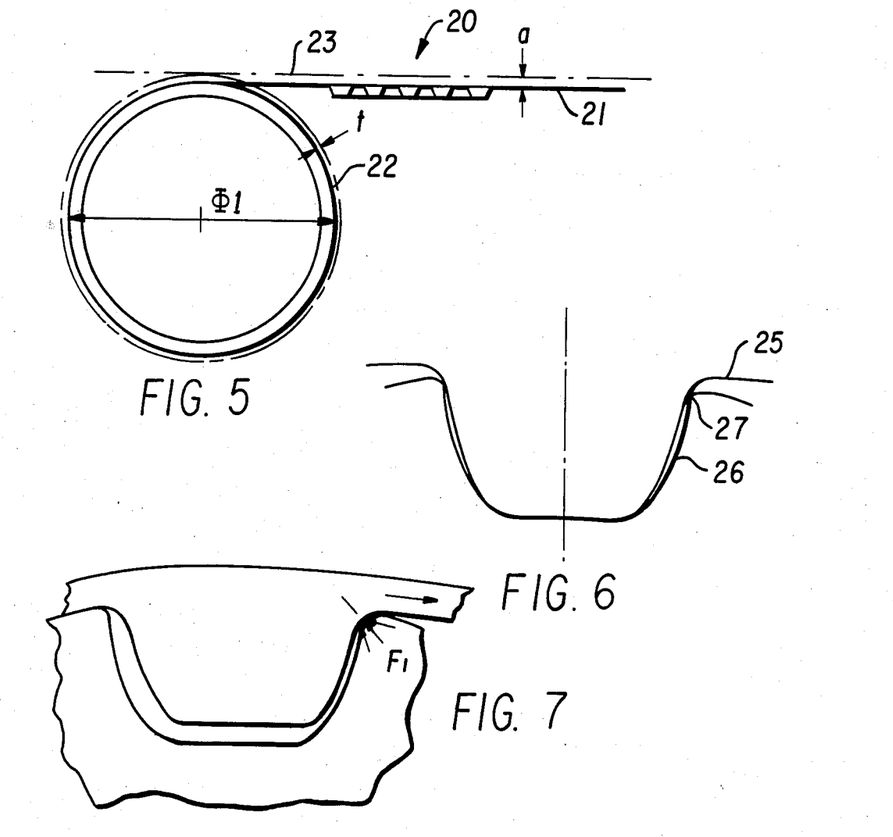
FIG. 5 shows the hob of the grooves of a pulley and the relative pulley.
FIG. 6 shows the grooves of two pulleys having different diameters, a great diameter and a small diameter, formed according to the state of the art.
FIG. 7 shows a drive system comprising a belt and a small diameter pulley having a groove formed according to the state of the art.

This is apparent from the quite edge-shaped configurations and from the variation of the inclination of the flanks of the grooves in the passage from a great pulley 25 to a small one 26, as schematically shown in FIG. 6. It is evident that in the pulleys having a small diameter, the presence of accentuated edges on the contact zone 27 and the inclination of the flanks lead to the removal from the flanks of the belt tooth, creating both an excessive concentration of stresses at the root of the belt tooth, as indicated in FIG. 7 by arrows $F_1$, and a reduction in the area of contact between the belt and the pulley.

These two effects constitute the main cause of the short lifetime and the poor resistance to the skipping phenomenon in a drive system comprising small diameter pulleys.

In fact, the accentuated edges bring about a quick wearing of the belt surface during the engagement and also when the belt is engaged, the stress at the root of the tooth being too concentrated, causing thus the known fatigue cracks.

Moreover, it is evident from FIG. 7 that owing to the minimal surface of contact between the belt and the pulley, the cited skipping phenomenon becomes more readily evident.

By contrast to the known technique, the present inventors have now found that it is possible to eliminate the previously cited drawbacks by using the profiles of the pulley grooves generated by the rolling without the sliding of the hob cutting pitch line 21 on the outer circumference 22 of the pulley (FIG. 5), i.e., nullifying the distance "a".

A possible explanation of the advantages achieved by means of the profiles generated, as described above, derives from the fact that by placing the hob rolling pitch line tangent to the outer circumference of the pulley, it is possible to obtain for all the points of the profiles generated during the rolling an approach of said points to the centers of instantaneous rotation.

In other words, according to the present invention, the points of the profiles of the grooves have smaller radii with respect to those according to known prior art, reaching thus a more gradual and accentuated curvature in the curvilinear portions of the grooves, the whole having the result of eliminating or at least attenuating the edges 27 of the grooves, as represented in FIG. 6.

Consequently, it can be stated that the pulleys of the present invention not only have parabolic arc-shaped groove profiles suitable for the transient engagement and disengagement steps with the teeth of any profile of a belt, but also that said profiles formed with a distance "a" substantially equal to zero are maintained for small diameter pulleys, in particular in the contact zones.

Figure 8:
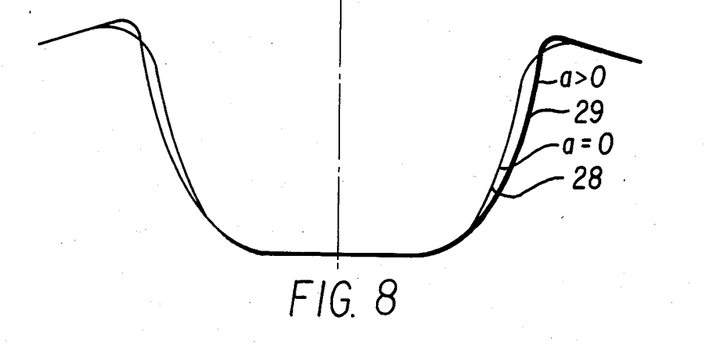
FIG. 8 shows a comparison between the grooves of the small diameter pulleys whose profiles are formed according to the state of the art and according to the present invention, respectively.
Figure 9:
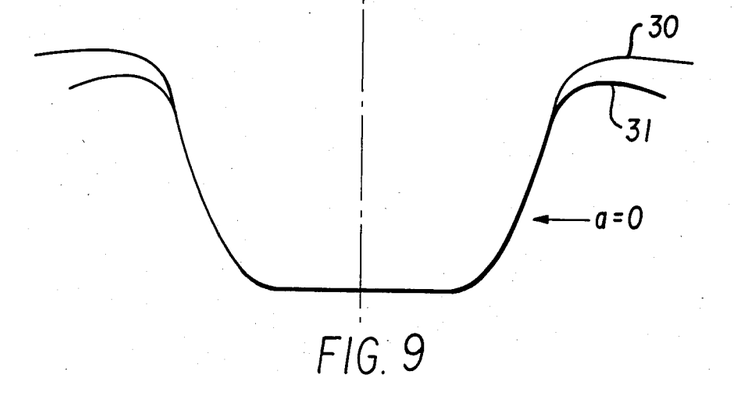
FIG. 9 shows a comparison between the grooves of two pulleys with predetermined shape maintaining the rolling pitch line of the hob tangent to the outer circumference of the pulleys.

This situation is furthermore schematized in FIG. 8. for a better description of two small diameter pulleys, respectively 28, 29, the first pulley with grooves generated with a distance "a" equal to zero, and the second pulley with a distance "a" greater than zero. Moreover, FIG. 9 stresses the absence of edges in the upper contact zone of a groove in the embodiment of a profile shaped according to a parabolic arc when the distance "a" is zero, and from a greater diameter pulley 30 it is passed to a smaller diameter pulley 31.

Figure 10:
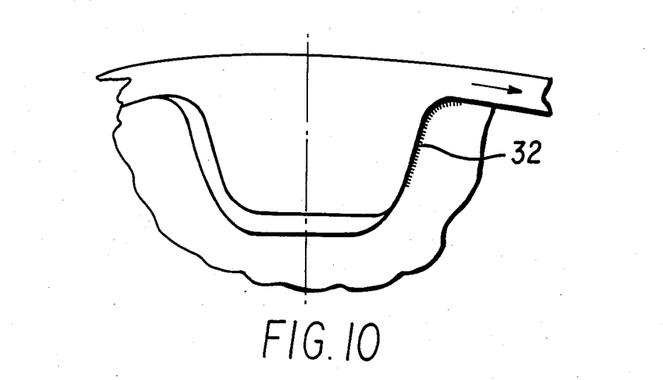
FIG. 10 shows the transmission of motion between the belt and the pulley whose grooves have profiles formed according to the present invention.

The optimal situation achieved by means of the present invention, in particular as regards the wide zone of contact between the belt and the pulley, is furthermore shown schematically by reference numeral 32 in FIG. 10.

What is claimed is:

1. A pulley suitable for the transmission of motion with a flexible toothed belt of polymeric material comprising a plurality of grooves alternating with teeth, each groove comprising two flanks and each flank having a parabolic arc-shaped profile, said groove having a bottom whose ends coincide with the vertices of the parabolic arc-shaped profiles, the length of said bottom being at least approximately 65% of the length of each parabolic arc-shaped profile of the flanks of said groove, the length of each parabolic arc-shaped profile being measured between said vertices and a point of a circle having a predetermined radius r connecting the flank with the tooth of the pulley, each of said arc-shaped profiles being defined by the curve:

$$y = Kx^2$$

where:

$$K = \frac{\tan^2(90 - \beta)}{4Y_o}$$

$Y_o = H - r(1 - \sin \beta)$ and is the ordinate position of a tangent point between said parabolic arc-shaped profile and said circle of radius r;

y is an axis passing through one of the two ends of said bottom of the pulley;

x is an axis orthogonal to said axis y passing through said one of the two ends at the bottom of the pulley;

H is the height of the groove;

r is the radius of the circle connecting each flank with the teeth of the pulley; and $\beta$ is the angle formed by a tangent line common to said parabolic arc-shaped profile and to said circle of radius r, with the axis y.

2. A pulley as defined in claim 1, characterized in that each of said parabolic arc-shaped profiles is defined by the curve:

$$Y = KX^2$$

where K is between 0.09 and 25.83 upon varying the dimensions of the profile.

3. A pulley as defined in claim 1, characterized by the fact that the bottom of said groove is substantially flat.

4. A pulley as defined in claim 1, characterized in that the profile of the groove is determined by the rolling pitch line of the hob tangent to the outer circumference of the pulley.

5. A transmission means for synchronous transmission of motion, comprising a toothed belt of polymeric material and at least two pulleys, a driving pulley and a driven pulley respectively, said belt comprising teeth alternating with grooves for engagement with the corresponding grooves and the corresponding teeth in said pulleys, each of the grooves in at least one of said pulleys comprising two flanks, each flank having a parabolic arc-shaped profile, said groove having a bottom whose ends coincide with the vertices of the parabolic arc-shaped profiles, the length of said bottom being at least approximately 65% of the length of each parabolic arc-shaped profile of the said groove-flanks, the length of each parabolic arc-shaped profile being measured between said vertices and a point of a circle having a predetermined radius r connecting the flank with the tooth of the pulley, each of said arc-shaped profiles being defined by the curve:

$$y = Kx^2$$

where $$K = \frac{\tan^2(90 - \beta)}{4Y_o};$$

$Y_o = H = r(1 - \sin \beta)$ and is the ordinate position of a tangent point between said parabolic arc-shaped profile and said circle of radius r;

y: is an axis passing through one of the two ends of said bottom of the pulley;

x: is an axis orthogonal to said axis y passing through said one of the two ends at the bottom of the pulley;

H: is the height of the groove;

r: is the radius of the circle connecting each flank with the teeth of the pulley; and $\beta$: is the angle formed by a tangent line common to said parabolic arc-shaped profile and to said circle of radius r, with the axis Y.

6. A pulley as defined in claim 1, characterized in that the tangents of the two radially outermost points of the parabolic arc-shaped profiles form with the radii of the pulley passing through the two points of contact of the parabola with the bottom of the groove an edge between 8° and 25°.

7. A pulley as defined in claim 6, whose ratio between the width and the depth of the groove is between 1.3 and 3.

8. Means for the synchronous transmission of motion between a toothed belt of polymeric material and at least two pulleys, a driving pulley and a driven pulley, respectively, said belt comprising teeth alternating with grooves for the engagement with the corresponding grooves and the corresponding teeth in said pulleys, said synchronous transmission means being characterized in that in at least one of said pulleys each groove comprises two lateral profiles with variable radii of curvature gradually formed by two parabola-shaped arcs whose vertices are disposed on a line forming the bottom of the groove, the length of said bottom being at least approximately 65% of the length of each of said parabolic arc-shaped profiles, the curve of each parabola-shaped arc following the formula:

$$Y = KX^2$$

where K is between 0.09 and 25.83.

9. Means for the transmission of motion between a toothed belt of polymeric material and at least two pulleys as defined in claim 8, characterized in that the grooves of each pulley are delimited by said parabolic arc-shaped profiles and by said bottom whose extremities are the vertices of the two parabola-shaped arcs.

10. Means for the transmission of motion as defined in claim 8 or 9, characterized in that the grooves of the two pulleys of the drive system have equal shapes and dimensions.

11. Means for the transmission of motion as defined in claim 8, characterized in that the depth of the pulley groove is greater than the height of the corresponding belt tooth.

12. Means for the transmission of motion as defined in claim 8, characterized in that the profiles of the grooves of the two pulleys are generated by a hob whose cutting pitch line rolls without sliding on the outer circumference of said pulleys.

* * * * *